United States Patent Office.

H. G. POPE AND H. F. HERRICK, OF NEW BERLIN, NEW YORK.

Letters Patent No. 65,693, dated June 11, 1867.

IMPROVED MEDICAL COMPOUND.

*The Schedule referred to in these Letters Patent and making part of the same.*

TO ALL WHOM IT MAY CONCERN:

Be it known that we, H. G. POPE and H. F. HERRICK, of New Berlin, Chenango county, New York, have invented a new and improved Medical Compound; and we do hereby declare that the following is a full, clear, and exact description thereof, which will enable others skilled in the art to make and use the same.

The present invention relates to a compound for the cure and removal of spavin and other similar complaints in horses, which compound is of such a nature that all blemishes upon horses, which are not composed of bone, can be removed without breaking the skin or removing the hair.

This compound is composed of the several ingredients hereinafter named, and mixed together in or about the proportions specified: Four (4) ounces tallow, four (4) ounces lard, one-half ($\frac{1}{2}$) ounce oil origanum, one-half ($\frac{1}{2}$) ounce oil lavender, one-half ($\frac{1}{2}$) ounce *Pulvis cantharides*, one and one-quarter ($1\frac{1}{4}$) ounce iodine ointment, one (1) ounce blue mass, fifteen (15) grains protochloride of mercury; extract of logwood, sufficient quantity to color the mixture or compound.

The lard and tallow, in the proportion above stated, are first heated to a temperature of 200° Fahrenheit, or thereabouts, when to them are then added the other ingredients in the respective proportions stated, and the whole stirred till cool, when color with the extract of logwood.

Having thus described our invention, we claim as new, and desire to secure by Letters Patent—

A medical compound, made of the ingredients mixed together in and about the proportions, substantially as and for the purposes described.

H. G. POPE,
H. F. HERRICK.

Witnesses:
JOSEPH ARNOLD,
W. F. JENKS.